(12) United States Patent
Soshino et al.

(10) Patent No.: US 7,174,877 B2
(45) Date of Patent: Feb. 13, 2007

(54) THROTTLE VALVE OPENING AND CLOSING DEVICE

(75) Inventors: Masahiko Soshino, Hitachiohta (JP); Takehiko Kowatari, Kashiwa (JP); Yuzo Kadomukai, Ishioka (JP); Yuki Ejiri, Hitachinaka (JP); Kenji Ono, Mito (JP); Yasuhiro Kamimura, Hitachinaka (JP); Norihiro Isozaki, Hitachinaka (JP); Eisuke Wayama, Hitachinaka (JP); Hitoshi Andoh, Hitachinaka (JP); Yutaka Takeuchi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/115,314

(22) Filed: Apr. 27, 2005

(65) Prior Publication Data

US 2005/0183696 A1    Aug. 25, 2005

Related U.S. Application Data

(63) Continuation of application No. 10/670,251, filed on Sep. 26, 2003, now Pat. No. 6,932,051.

(30) Foreign Application Priority Data

Nov. 14, 2002    (JP) .............................. 2002-331115

(51) Int. Cl.
*F02D 9/08* (2006.01)
(52) U.S. Cl. ....................... 123/337; 123/399; 251/208; 251/305
(58) Field of Classification Search ................ 123/337, 123/361, 396, 399; 251/208, 305
See application file for complete search history.

(56) References Cited

U.S. PATENT DOCUMENTS

| 4,391,247 | A | * | 7/1983 | Shioyama et al. .......... 123/403 |
| 4,947,815 | A | | 8/1990 | Peter |
| 5,315,975 | A | * | 5/1994 | Hattori et al. .............. 123/337 |
| 5,374,031 | A | * | 12/1994 | Semence et al. ............ 251/305 |
| 5,465,696 | A | * | 11/1995 | Gmelin ........................ 123/337 |
| 5,492,097 | A | | 2/1996 | Byram et al. |
| 5,722,366 | A | * | 3/1998 | Adachi et al. .............. 123/337 |
| 5,975,051 | A | | 11/1999 | Yamada et al. |
| 6,006,722 | A | * | 12/1999 | Hall ........................... 123/337 |
| 6,089,208 | A | | 7/2000 | Kowatari et al. |
| 6,454,242 | B1 | * | 9/2002 | Garrick et al. .............. 123/337 |
| 6,772,730 | B2 | * | 8/2004 | Kohlen ....................... 123/337 |

FOREIGN PATENT DOCUMENTS

| JP | 2-500677 | 3/1990 |
| JP | 11-153053 | 6/1999 |

* cited by examiner

*Primary Examiner*—T. M. Argenbright
(74) *Attorney, Agent, or Firm*—Crowell & Morning LLP

(57) ABSTRACT

The invention is intended to simplify a default mechanism of a throttle valve opening and closing device for the purpose of improving mountability of the device to a vehicle. When a motor generate no driving forces, a throttle valve is held in a position (1) by a return spring. In this position, gaps are formed between the throttle valve and a wall surface of an intake passage. Spherical recesses are formed in parts of the wall surface of the intake passage. In a position (2) where the throttle valve is opposed to the spherical recesses, the gaps are minimized in an operating range of the throttle valve.

5 Claims, 15 Drawing Sheets

THROTTLE VALVE OPENING AND CLOSING DEVICE

This application is a continuation of application Ser. No. 10/670,251 filed Sep. 26, 2003 now U.S. Pat. No. 6,932,051.

BACKGROUND OF THE INVENTION

1. Field of the Invention

The present invention relates to a throttle valve opening and closing device for changing a flow rate of intake air introduced to an internal combustion engine for a vehicle.

2. Description of the Related Art

One conventional throttle valve opening and closing device for a vehicle, which has a throttle valve driven by a motor, is disclosed, for example, in JP,A 2-500677 (PCT Laid-Open Publication No. WO88/00404). The disclosed device comprises a return spring for biasing the throttle valve in the closing direction, and a second spring for biasing the throttle valve in the opening direction contrary to the return spring. When the throttle valve is not driven by the motor, the throttle valve is automatically adjusted to an opening degree at which the biasing force of the return spring is balanced by the biasing force of the second spring.

In this specification, an initial position of a throttle valve maintained by biasing means, e.g., a return spring, for biasing the throttle valve to the initial position when the throttle valve is not driven by driving means, e.g., a motor, is referred to as a "default position" in the following description.

The reasons why a mechanism for setting the default position is provided are as follows:

1. Even when no driving forces are generated during parking, the mechanism positively defines a gap between the throttle valve and an intake passage (specifically a wall surface of an intake passage) to prevent sticking of the throttle valve, which is otherwise possibly caused by freezing or contamination occurred between the throttle valve and the intake passage.

2. When the throttle valve opening and closing device is failed and power supply to the motor is stopped, the mechanism is operated to quickly set the position of the throttle valve so as to provide an opening degree at which such a flow rate of intake air as not stalling the engine is obtained while preventing runaway of the vehicle, or to ensure self-controlled traveling (limp home mode).

Also, a throttle valve opening and closing device for a vehicle, disclosed in JP,A 11-153053, comprises a link or cam mechanism for transmitting rotation of a motor to a throttle valve, and a return spring for biasing the throttle valve in the closing direction to reduce its opening degree. This device further comprises a mechanism for operating the throttle valve such that, when the motor is rotated in one direction from the default position, the throttle valve is operated once in the closing direction from the default position, and when the motor rotation is further continued thereafter, the rotating direction of the throttle valve is reversed and the throttle valve is operated until reaching a fully opened position.

In the device utilizing the opposed biasing forces to realize the default position as disclosed in the above-cited JP,A 2-500677 (PCT Laid-Open Publication No. WO88/00404), a delay occurs in the operation of the throttle valve when the valve operation is performed across the default position. This is because the direction of a load imposed on the motor for generating the driving force is reversed upon crossing the default position and a control process takes a time until the reversal in the direction of torque is determined. Another problem is that, due to the necessity of providing two springs for developing biasing forces in opposed directions, the mechanism is complicated, thus resulting in deterioration of both mass producibility and mountability to the vehicle.

Also, the device disclosed in the above-cited JP,A 11-153053 is free from the reversal in the direction of spring biasing forces upon crossing the default position, but it requires the steps of, when the throttle valve must be operated from the default position to the fully opened state, operating the throttle valve once in the closing direction until teaching a fully closed state and then reversing the rotating direction of the throttle valve to operate it from the fully closed state to the fully opened state. Therefore, a delay caused with the reversal in the rotating direction of the throttle valve is not negligible. In other words, looking at a series of valve operations from the default position to the fully opened state, the device disclosed in the above-cited publication has a problem that a useless step of reversing the operation of the throttle valve is included and the throttle valve cannot be operated at a high speed.

SUMMARY OF THE INVENTION

Accordingly, it is an object of the present invention to provide a throttle valve opening and closing device, which can hold a throttle valve in a default position when a force for driving the throttle valve is not generated, and can operate the throttle valve at a high speed from the default position to a fully opened state by using a simple mechanism.

To achieve the above object, the throttle valve opening and closing device according to the present invention includes an air passage defined by an intake passage and having a default position in which a throttle valve is located when a driving force from a driving mechanism does not act on the throttle valve, a position of a minimum opening area in which an opening area of the intake passage is minimized within a movable range of the throttle valve, and an operating range in which the opening are is gradually increased from the minimum opening area, the default position, the position of the minimum opening area and the operating range being formed in successive order in a rotating direction of the driving mechanism and the throttle valve.

With that construction, by using a simple mechanism, the throttle valve can be held in the default position when the forces for driving the throttle valve is not generated, and the throttle valve can be operated at a high speed from the default position to a fully opened state.

DESCRIPTION OF THE PREFERRED EMBODIMENTS

A throttle valve opening and closing device for an internal combustion engine according to a first embodiment of the present invention will be described below with reference to FIGS. 1 to 3.

Figure 1:
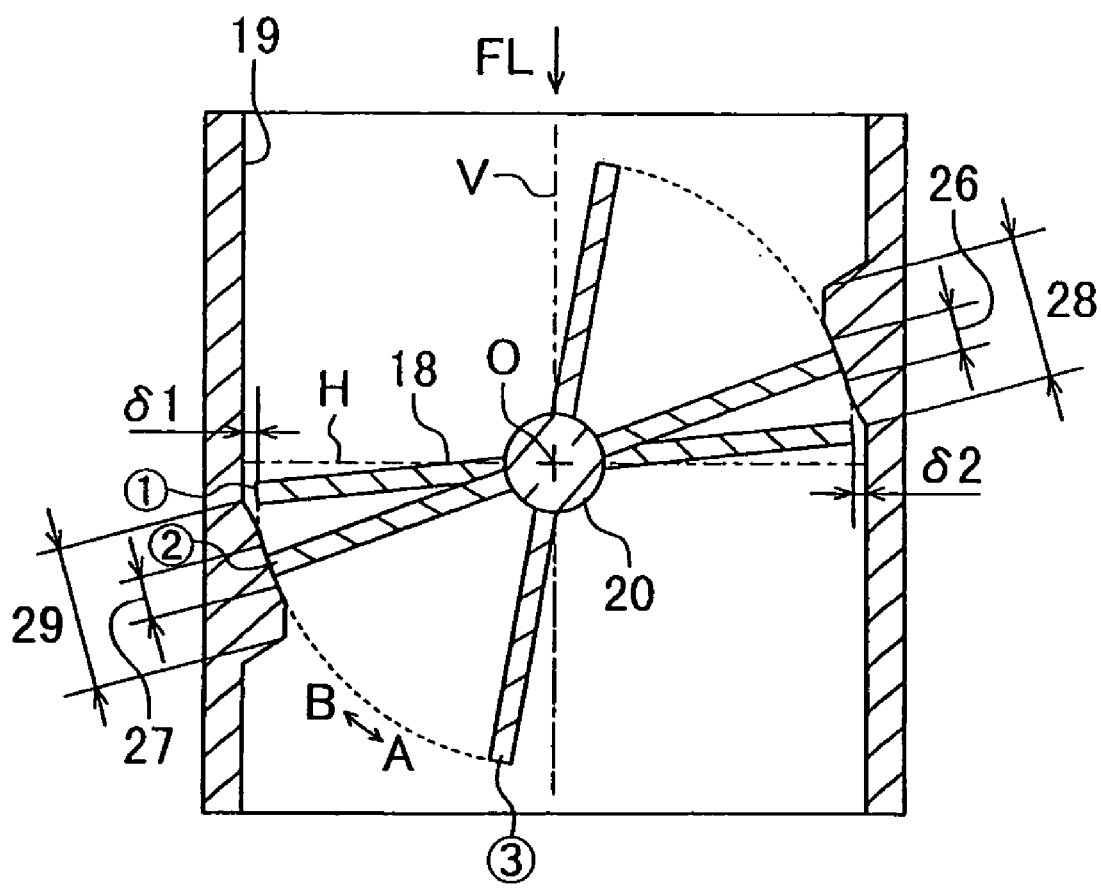
FIG. 1 is a sectional view of a throttle valve opening and closing device, including an intake passage, for an internal combustion engine according to a first embodiment of the present invention.
Figure 2:
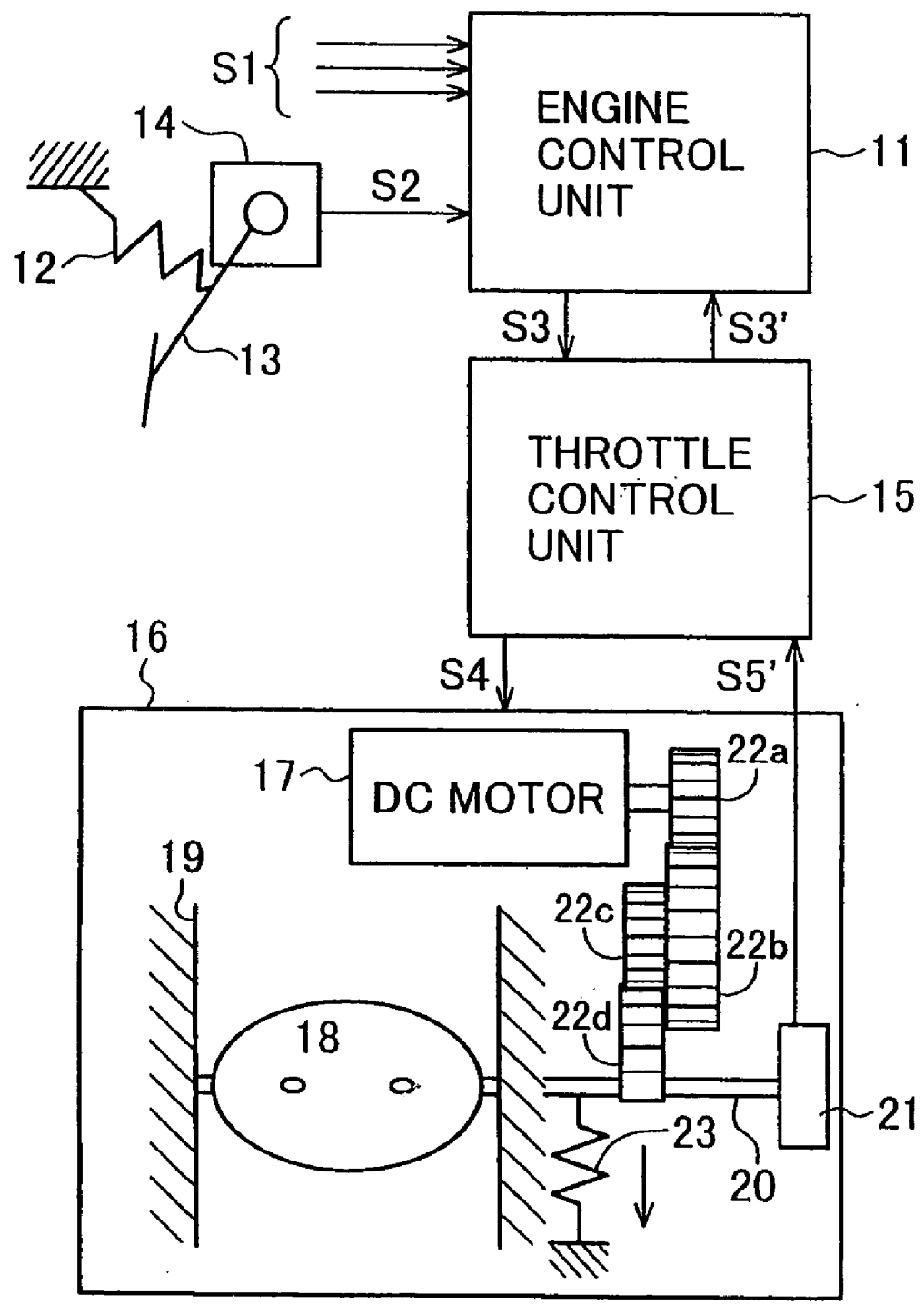
FIG. 2 is a block diagram of the throttle valve opening and closing device for the internal combustion engine according to the first embodiment, the diagram also showing a system for controlling the throttle valve opening and closing device.
Figure 3A:
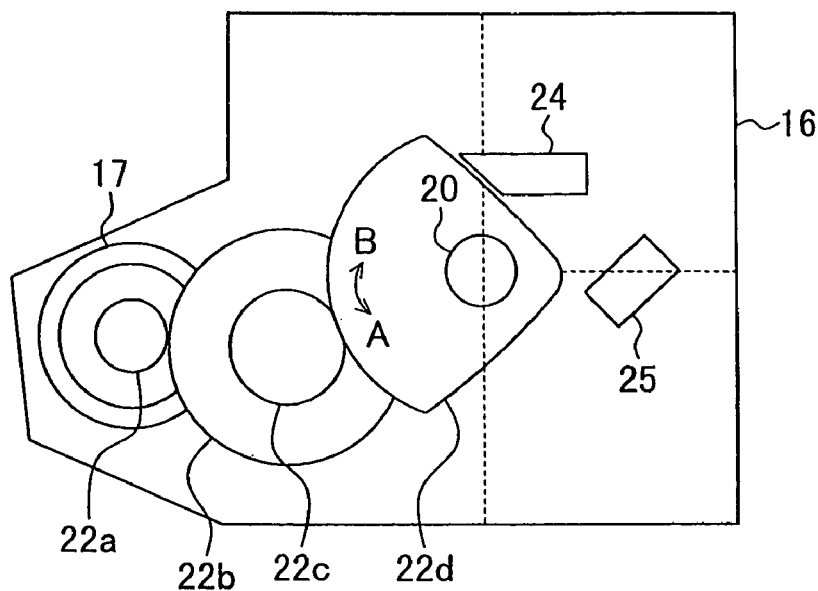
FIGS. 3A and 3B show respectively a driving mechanism and a cross-section of the throttle valve opening and closing device.
Figure 3B:
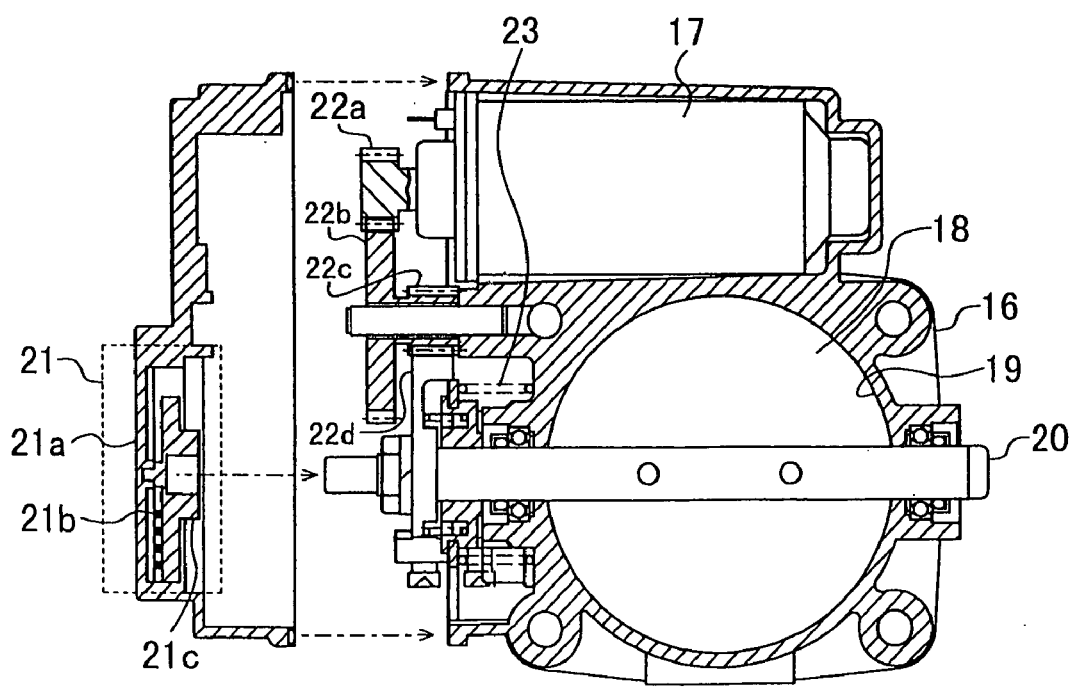

FIG. 1 is a sectional view of a throttle valve opening and closing device, including an intake passage, for an internal combustion engine according to a first embodiment of the present invention. FIG. 2 is a block diagram of the throttle valve opening and closing device for the internal combustion engine according to the first embodiment, the diagram also showing a system for controlling the throttle valve opening and closing device. FIG. 3A shows a driving mechanism of the throttle valve opening and closing device. FIG. 3B shows a radial cross-section of the intake passage provided with the throttle valve opening and closing device.

A throttle valve 18 is fixed to a throttle shaft 20. The throttle shaft 20 is rotatably supported perpendicularly to the axial direction of an intake passage 19. A speed reducing gear 22a is fixed to an output shaft of a motor 17 that serves as driving means for the throttle valve 18. The speed reducing gear 22a is meshed with a speed reducing gear 22b. The speed reducing gear 22b is coupled to a reducing gear 22c. The speed reducing gear 22c is meshed with a speed reducing gear 22d fastened to the throttle shaft 20. An operating range of the speed reducing gear 22d is limited by a default stopper 24 fixed to a throttle body 16 for restricting the rotation of the reducing gear 22d in a direction B, and is also limited by a full-open stopper 25 fixed to the throttle body 16 for restricting the rotation of the reducing gear 22d in a direction A.

With that construction, when the motor 17 rotates, the speed reducing gears 22a to 22d are rotated to drive the throttle valve 18 for rotation. With the rotation of the throttle valve 18, an opening area of the intake passage 19 varies and a flow rate of intake air introduced to the internal combustion engine changes correspondingly.

A return spring 23 as a resilient member gives a biasing force to the speed reducing gear 22d in the rotating direction (indicated by an arrow B shown in FIG. 1) in which the throttle valve 18 is rotated from a fully opened state providing a maximum opening degree to a fully closed state providing a minimum opening degree.

The return spring 23 always develops torque in the direction B to such an extent that, regardless of the throttle valve 18 being positioned anywhere, the setting torque is enough to rotate the throttle valve 18 until one end of the gear 22d strikes against the default stopper 24 and the throttle valve 18 is returned and stopped in a position (1) (corresponding to an opening degree in a posture closest to the horizontal direction as viewed on the drawing sheet). The position in which the one end of the gear 22d strikes against the default stopper 24 and the throttle valve 18 is stopped is referred to as a default position. When the throttle valve 18 is in the default position, the opening area between the throttle valve 18 and a wall surface of the intake passage 19 is set to be not smaller than that required for idling of an engine.

An accelerator pedal 13 is biased by an accelerator pedal spring 12 in a direction opposed to the depressing direction of the accelerator pedal. When a driver depresses the accelerator pedal 13, an amount of the pedal depression is detected by an accelerator position sensor 14. An accelerator position signal S2 produced as an output of the accelerator position sensor 14 is taken in by an engine control unit 11. The engine control unit 11 further takes in engine operating information S1, such as an engine revolution speed, an amount of intake air introduced to the engine, and a temperature of engine cooling water. Based on the accelerator position signal S2 and the engine operating information S1, the engine control unit 11 computes a target opening degree of the throttle valve 18 and outputs a target opening-degree signal S3 for the throttle valve 18 to a throttle control unit 15.

A position of the throttle valve 18 is detected by a throttle position sensor 21, which is mounted to one end of the throttle shaft 20 and monitors a rotational angle of the throttle shaft. A throttle actual opening-degree signal S5 produced as an output of the throttle position sensor 21 is taken in by a throttle control unit 15. The throttle control unit 15 compares the throttle actual opening-degree signal S5 with the throttle target opening-degree signal S3 and controls a motor driving current S4 such that the throttle actual opening-degree signal S5 is matched with the throttle target opening-degree signal S3. Then, the throttle control unit 15 outputs the throttle actual opening-degree signal S5 as a throttle actual opening-degree signal S3' to the engine control unit 11.

In such a manner, the engine control unit 11 and the throttle control unit 15 can not only control the position of the throttle valve 18 depending on the amount of depression of the accelerator pedal 13, but also control the position of the throttle valve 18 regardless of the amount of depression of the accelerator pedal 13 depending on a particular engine operating state.

As shown in FIG. 1, the throttle valve 18 is fixed to the throttle shaft 20. The throttle shaft 20 penetrates the intake passage 19 and is rotatably mounted to the throttle body 16. The intake air flows through the intake passage 19 in the vertical direction from the upper side toward the lower side as indicated by an arrow FL.

In the wall surface of the intake passage 19, spherical recesses are formed along parts of spherical loci which are drawn by both outer peripheral edges of the throttle valve 18 when the throttle valve 18 rotates. More specifically, assuming that two outer peripheral edges of the throttle valve 18 are referred to as a first outer peripheral edge rotating upstream of the airflow and a second outer peripheral edge rotating downstream of the airflow when the throttle valve 18 rotates in the direction A, a first spherical recess 26 is formed in a part of the wall surface of the intake passage 19 upstream of the throttle shaft 20 in an opposed relation to the first outer peripheral edge, and a second spherical recess 27 is formed in a part of the wall surface of the intake passage 19 downstream of the throttle shaft 20 in an opposed relation to the second outer peripheral edge. In order to surely provide a minimum opening area when the outer peripheral edges of the throttle valve 18 are positioned to face the spherical recesses, the arc length of each spherical recess 26, 27 is set to be greater than the thickness of the throttle valve 18 as viewed in an axial section of an intake pipe.

Areas upstream and downstream of the spherical recesses 26, 27 are formed to provide smooth continuous wall surfaces including the spherical recesses so that opening degree characteristics of the throttle valve 18 will not abruptly change throughout before and after the throttle valve 18 passes the spherical recesses, i.e., that gaps $\delta 1$, $\delta 2$ shown in FIG. 1 will not abruptly change. Such moderate changes of the gaps $\delta 1$, $\delta 2$ make it possible to prevent an abrupt change of the opening area, i.e., an abrupt change in the flow rate of intake air with respect to the rotational angle of the throttle valve 18.

A numeral (1) shown in FIG. 1 represents a state in which the throttle valve 18 is held in the default position by the return spring 23. The gaps $\delta 1$, $\delta 2$ are left between the wall surface of the intake passage 19 and the outer peripheral edges of the throttle valve 18.

In the state (1) shown in FIG. 1, the throttle valve 18 is positioned closest to the horizontal direction (indicated by a broken line H) as viewed on the drawing sheet and has a maximum projection area, as viewed from the upper side on the drawing sheet, in comparison with a projection area of the throttle valve 18 in any of other positions such as denoted by (2) and (3).

When the motor 17 rotates with supply of an electric current, the throttle valve 18 is rotated in the direction A about the center O of the throttle shaft 20 and then reaches the position (3) (close to the vertical direction indicated by a broken line V as viewed on the drawing sheet). At this time, the throttle valve 18 is in a "fully opened" position in which the throttle valve 18 has a minimum projection area as viewed from the upper side on the drawing sheet, i.e., it provides a maximum opening area.

The wall surface of the intake passage 19 is provided with a projection area 28 including the spherical recess 26 and a projection area 29 including the spherical recess 27. In the throttle position (2) in which the throttle valve 18 is positioned to face the recesses 26, 27, the gaps $\delta 1$, $\delta 2$ are each minimized within the operating range of the throttle valve 18. Stated another way, the throttle valve 18 is in a "fully closed" state in which the opening area obtainable with the throttle valve opening and closing device of the present invention is minimum, i.e., in which the flow rate of intake air flowing through the intake passage 19 is also minimum.

Figure 4:
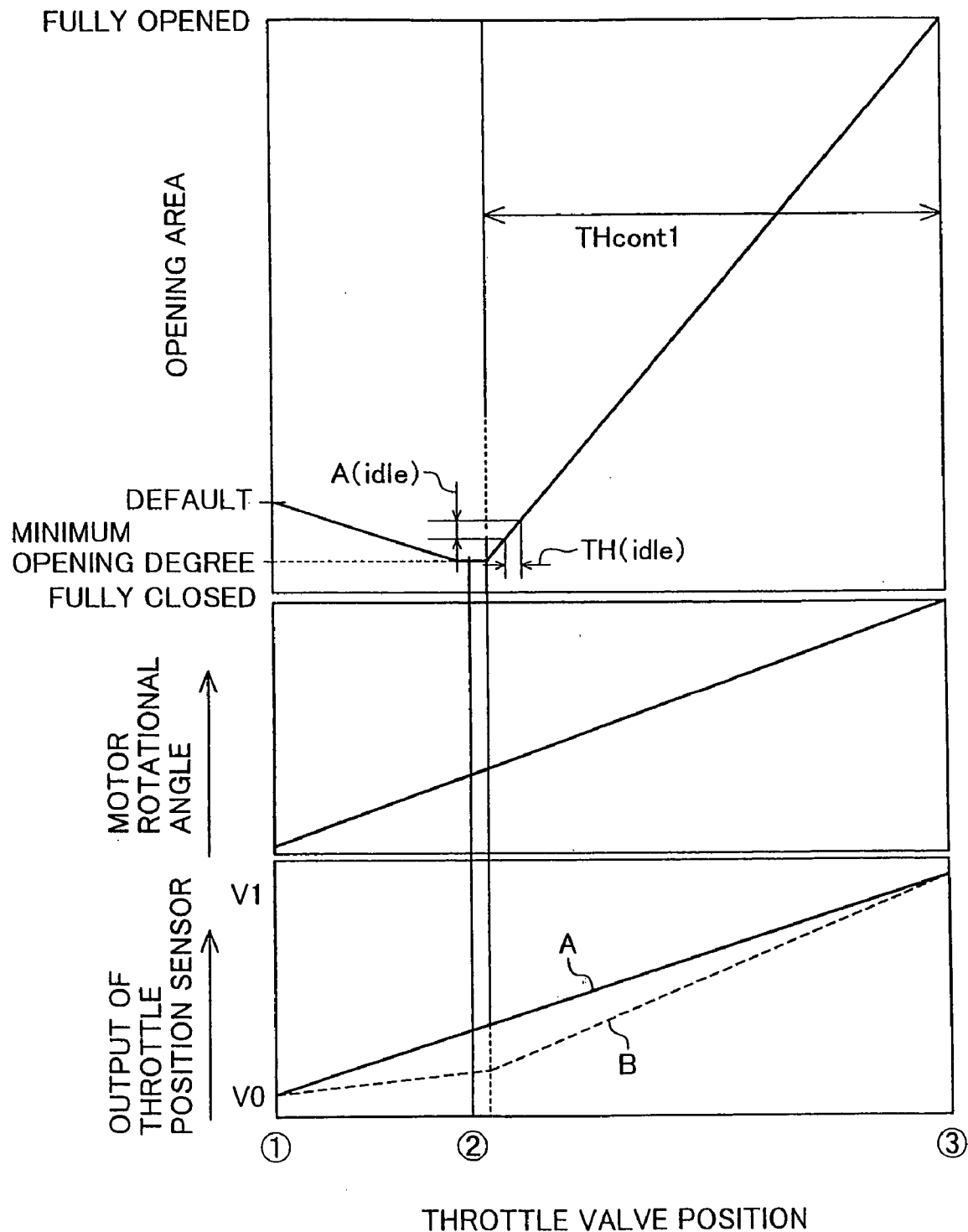
FIG. 4 shows characteristics of the throttle valve opening and closing device according to the first embodiment.

An upper graph in FIG. 4 shows the relationship between the opening area and the position of the throttle valve 18, a middle graph shows the relationship between the rotational angle of the motor 17 and the position of the throttle valve 18, and a lower graph shows the relationship between the output of the throttle position sensor 21 and the position of the throttle valve 18. In the position (1), the throttle valve 18 has an opening area corresponding to the default position. In an operating range during which the throttle shaft 20 is rotated in the direction A and the throttle valve 18 reaches the position (2), the opening area gradually reduces with the presence of the projections 28, 29. Then, while the throttle valve 18 is positioned in a facing relation to the wall surfaces of the intake passage 19 defined by the spherical recesses 26, 27, the opening area is minimized. Thereafter, with further rotation of the throttle valve 18 in the direction A, the opening area is monotonously increased until the position (3) in which the throttle valve 18 is fully opened.

As seen from FIG. 4, the sign of a change rate of the opening area is changed from (−) in the range between the positions (1) and (2) to (+) in the range between the positions (2) and (3).

Thus, in this embodiment, in an initial state in which the driving force of the driving means for the throttle valve does not act on the throttle valve, the throttle valve is held in a state having an opening area larger than that corresponding to the minimum opening degree. When the driving means is operated in one direction to rotate the throttle valve from the initial state, the throttle valve is rotated in a constant direction and the sign of a differential value resulting from differentiation of the opening area with respect to the position of the throttle valve is reversed once within the operating range of the throttle valve.

In other words, the opening area of the intake passage has a predetermined size in the state in which the projection area of the throttle valve is maximized in the axial direction of the intake passage. With the driving means driven in one direction, the throttle valve is rotated in one direction, and as the projection area of the throttle valve decreases, the opening area of the intake passage is reduced for a while and then increased.

For realizing the throttle valve opening and closing device described above, the spherical recess is formed in the wall surface of the intake passage so as to face at least one of the first outer peripheral edge of the throttle valve on the side rotating toward the upstream side of the airflow and the second outer peripheral edge of the throttle valve on the side rotating toward the downstream side of the airflow.

The default position is realized by the return spring in this embodiment by forming the intake passage to have a particular shape as described above. Meanwhile, the second prior art (JP,A 11-153053) discloses the means for realizing the default position with a driving mechanism. The superiority of this embodiment will be described below.

Figure 5:
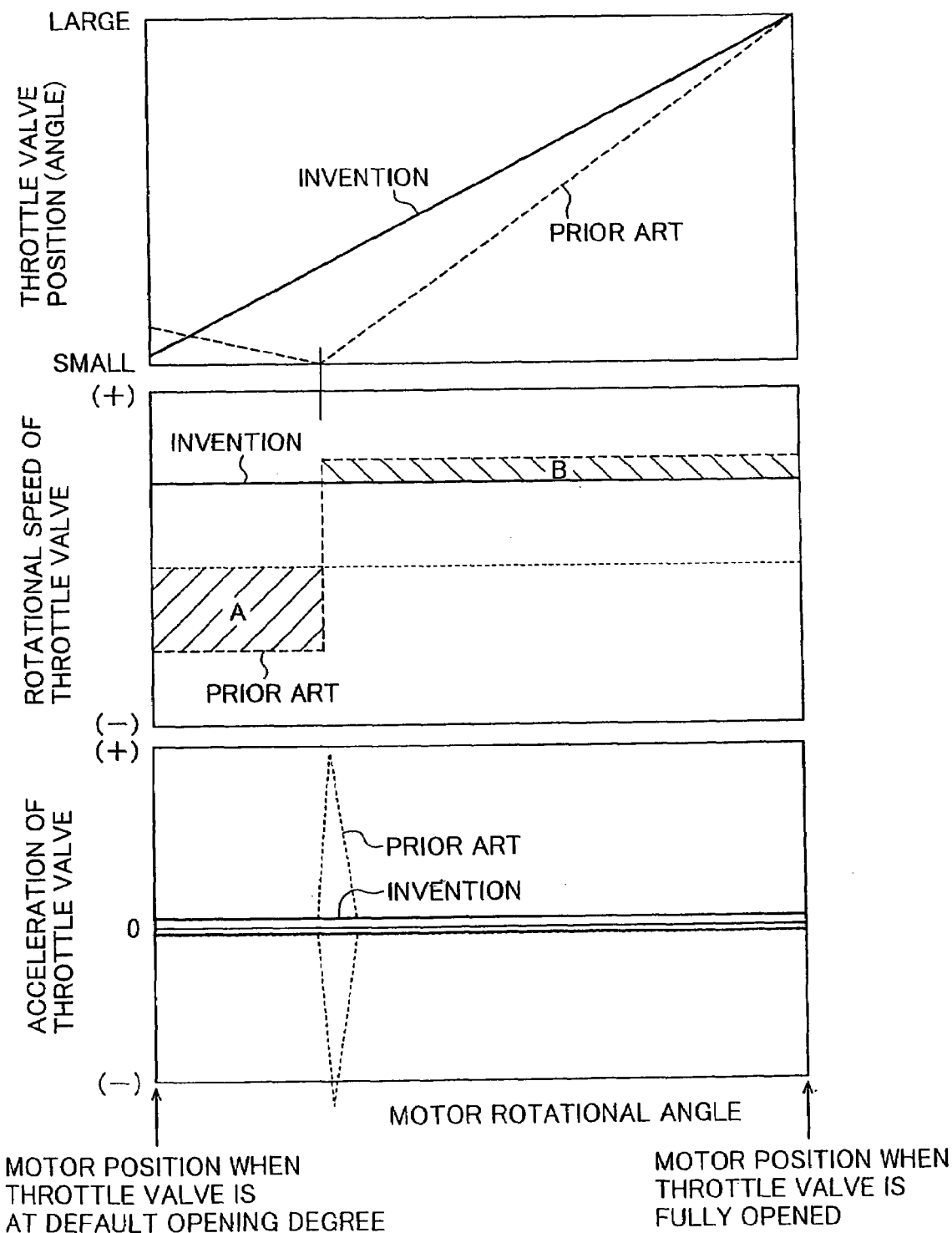
FIG. 5 shows operations of the first embodiment and second prior art for comparison between them.

A description is first made of the relationship between the operation of the throttle valve and the operation of the motor. Referring to FIG. 5, when the motor rotates in one direction, an angle representing the position of the throttle valve is monotonously increased. Here, when the motor is rotated at a constant speed, the throttle valve 18 is also rotated at a constant rotational speed that is decided in accordance with speed reduction ratios set for the speed reducing gears 22a to 22d in the form of spur gears. During the operation in which the throttle valve is rotated from the default position to the fully opened position or in which the throttle valve is conversely rotated from the fully opened position to the default position, therefore, the angular distance through which the throttle valve is rotated simply corresponds to an angle from the position (1) or (3) to the current position. An angle $\Delta\theta$ from the position (3) to (1) is about 80°. On the other hand, with the characteristics disclosed in the second prior art, the throttle valve is first operated in one direction from the default position to the fully closed position, and then the operating direction of the throttle valve is reversed. Accordingly, the total distance through which the throttle valve is moved from the default position to the fully opened position is the sum of Δθ and a distance θd from the fully closed position to the default position. In other words, the throttle valve cannot cover the total distance from the default position to the fully opened position unless it is moved over the additional distance corresponding to θd from the fully closed position to the default position. Assuming that the distance θd from the fully closed position to the default position is 11°, the total movement distance is given as 91° (=Δθ+θd). In trying to operate the throttle valve of the prior art from the default position to the fully opened position within the same time as that in the present invention, the throttle valve must be operated between the minimum opening degree position and the fully opened position at a speed (indicated by a region B in FIG. 5) increased so as to compensate for the additional movement distance because the throttle valve is rotated in the negative direction (indicated by a region A in FIG. 5) until reaching the minimum opening degree position in the prior art. Consequently, as compared with the second prior art, this embodiment just requires a motor having a smaller output if the operating speed is set to be the same, and can provide a throttle valve opening and closing device which is superior in mountability to the vehicle.

Further, in this embodiment, a load attributable to an acceleration force is applied to the throttle valve and the driving system only at the start and the end of the operation, at which the acceleration force is generated, during the operation between the default position and the fully opened position. In the driving mechanism of the second prior art, however, because the rotating direction of the throttle valve is reversed midway the operation, a load attributable to an acceleration force is also generated upon the reversal of the rotating direction and a torque load is applied to the motor. For that reason, the capacity of the motor must be increased correspondingly. Moreover, since the direction of the load torque varies, mechanism parts are more easily susceptible to wears. In contrast, the present invention is free from those problems because the operating direction of the throttle valve is constant regardless of the throttle valve position.

While the throttle valve opening and closing device of this embodiment has a spherical shape in a part of the wall surface of the intake passage, mass production of the throttle valve opening and closing device having such a shape can be efficiently realized with the steps of forming a near net shape with the use of a mold and carrying out finish mechanical working. To facilitate the formation of two spherical recesses, it is preferable to divide the mold into left and right halves, as viewed on the drawing sheet, at a boundary corresponding to the center line of a through hole formed in the suction passage to receive the throttle shaft, i.e., at a boundary represented by a broken line V in FIG. 1. This enables the two spherical recesses to be formed independently of each other by using the divided molds. Dividing the mold in such a way is advantageous from the viewpoint of production because it becomes possible to more precisely form the spherical recesses that particularly require a high accuracy in shape, and to cut down a time required for the finish mechanical working step. The two spherical recesses can also be separated from each other by separating a mold along the broken line H shown in FIG. 1. As seen from FIG. 3B, however, this division is not advantageous because divided molds are complicated due to the presence of a mount portion of the motor 17.

Figure 6:
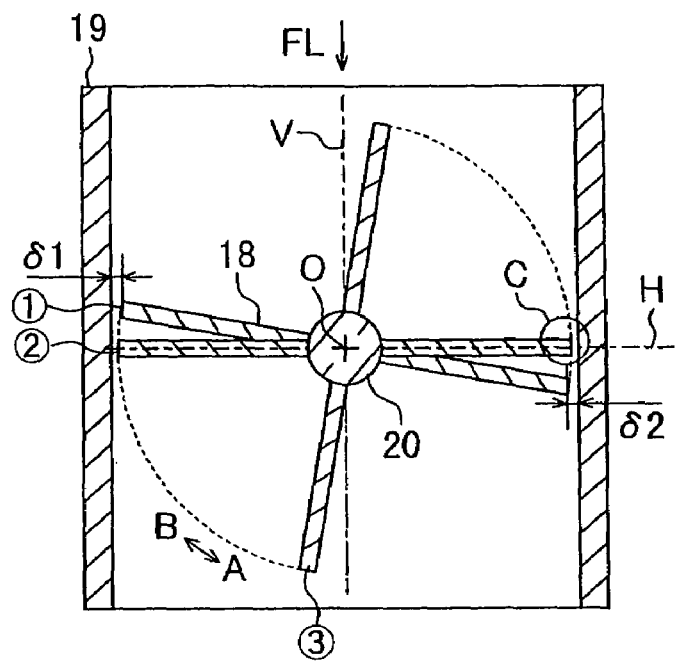
FIG. 6 is a sectional view of a throttle valve opening and closing device according to a second embodiment of the present invention.

While the default position is realized by one return spring in this embodiment by forming the spherical shape in a part of the wall surface of the intake passage, the default position can also be realized with a simpler structure shown in FIG. 6.

A second embodiment of the throttle valve opening and closing device will be described with reference to FIG. 6.

A throttle valve 18 is fixed to a throttle shaft 20. The throttle shaft 20 penetrates an intake passage 19 and is rotatably mounted to a throttle body 16. Intake air flows through the intake passage 19 in the direction indicated by an arrow FL.

In a state (1) shown in FIG. 6, gaps δ1, δ2 are left between outer peripheral edges of the throttle valve 18 and a wall surface of the intake passage 19 to provide an opening area corresponding to the default position. The throttle valve 18 is held in the default position by a return spring 23 (see FIG. 3B).

When a motor 17 (see FIG. 3B) rotates in one direction, the throttle valve 18 is rotated in the direction A about the center O of the throttle shaft and reaches a position (3) (close to the vertical direction indicated by a broken line V as viewed on the drawing sheet). At this time, the throttle valve 18 is in a "fully opened" position in which the throttle valve 18 has a minimum projection area as viewed from the upper side on the drawing sheet, i.e., it provides a maximum opening area.

When the throttle valve 18 is in a position (2) shown in FIG. 6, the throttle valve 18 lies perpendicularly to the axial direction of the intake passage 19 and the gaps δ1, δ2 are minimized. In the throttle position (2), therefore, the opening area are minimized, i.e., the flow ate of intake air flowing through the intake passage is also minimized.

FIG. 4 shows characteristics of the throttle valve opening and closing device of this embodiment. An opening degree characteristic is similar to that in the above-described first embodiment in which the spherical recesses are formed in the wall surface of the intake passage. As the throttle valve 18 rotates in the direction A, the opening area is reduced in a range from the throttle position (1) to (2) and is increased in a range from the throttle position (2) to (3).

As compared with the first embodiment, this second embodiment is advantageous in that the passage shape is simpler and therefore the working of the intake passage is facilitated. However, the distance from the default position (1) to the fully opened position (3) is increased and a longer time is required for the throttle valve to rotate throughout that distance.

The construction of this second embodiment has another disadvantage for the reason described later that the gaps δ1, δ2 must be set larger than those in the first embodiment from the viewpoint of preventing interference between the throttle valve and the wall surface of the intake passage when the throttle valve passes the position (2), and hence the minimum opening area has a larger value. In the worst case, there is a risk that an achievable minimum opening area becomes larger than the opening area required for idling and the idling cannot be realized only with the throttle valve opening and closing device.

Figure 7:
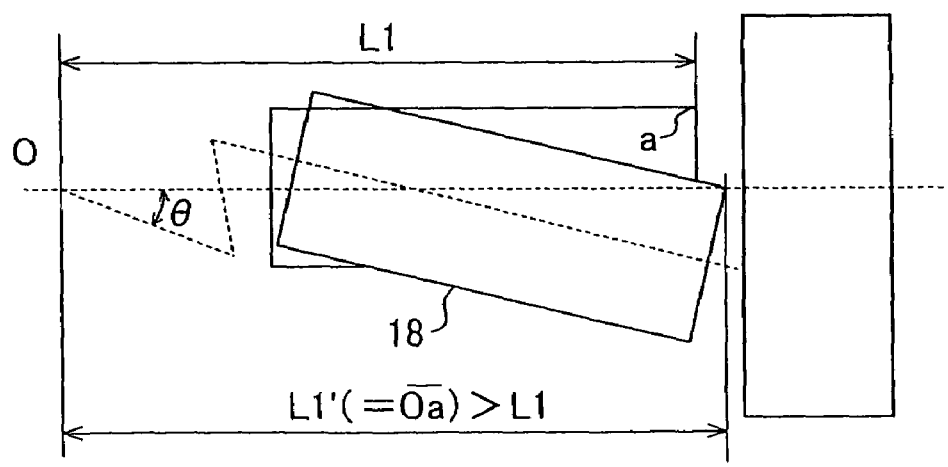
FIG. 7 is an enlarged view of an area C in FIG. 6.

The reason why the gap δ must be set larger than that in the first embodiment will now be described with reference to FIG. 7. FIG. 7 is an enlarged view of an area C in FIG. 6. When the throttle valve 18 is in the position (2), the distance from the center O of rotation of the throttle valve 18 to an outer peripheral end of the throttle valve 18 is L1. When the throttle valve 18 rotates through an angle θ, one edge (denoted by a) of the throttle valve 18 draws an arc-shaped locus about the center O with a radius given by a segment Oa. Because of the throttle valve 18 having a thickness, the segment Oa is longer than the distance L1. In order to prevent the interference, therefore, the pipe radius of the intake passage 19 must be set larger than the segment Oa. Accordingly, in the state in which the throttle valve 18 is in the position (2), the gaps δ1, δ2 are required to be set larger than those in the throttle valve opening and closing device having the spherical recesses formed in the wall surface of the intake passage 19.

Thus, this second embodiment can be applied to the case in which there are no problems even when the time required for the throttle valve to rotate from the default position to the fully opened position is longer and the minimum opening area is larger than those in the first embodiment.

A description is now made of operations of the throttle valve opening and closing device according to the embodiment of the present invention when it is equipped in a vehicle.

Figure 8:
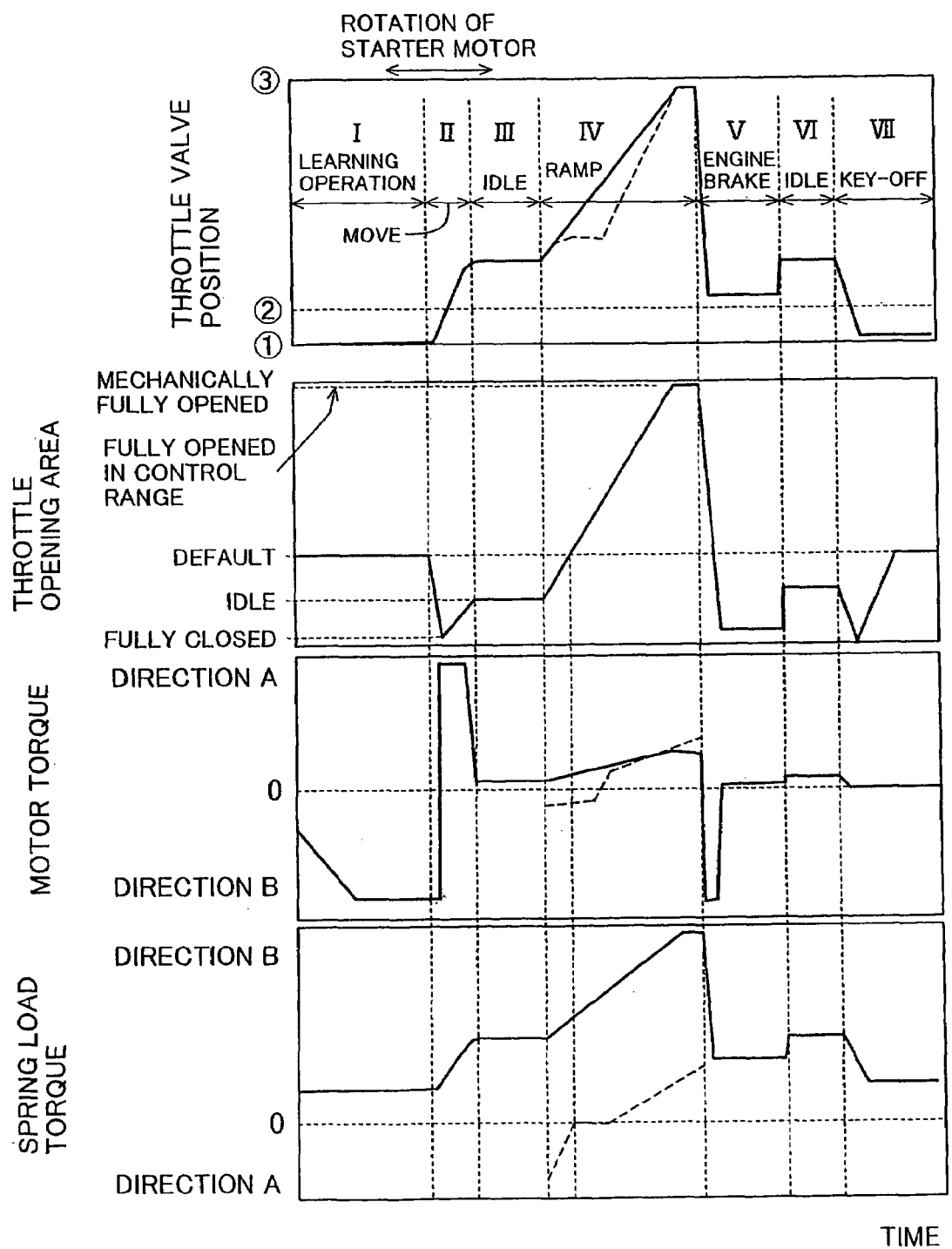
FIG. 8 is a set of graphs for explaining operations of the throttle valve opening and closing device according to the embodiment from key-on to key-off of a vehicle.

A series of operations of the throttle valve opening and closing device according to the embodiment of the present invention from key-on (turning-on of an ignition switch) to key-off of the vehicle will be described with reference to FIG. 8. In the following description, the series of operations are divided into regions I to VII depending on respective operating conditions, as shown in FIG. 8.

Region I—Key-on Operation: When a key switch is turned on, torque acting in the rotating direction B of the throttle valve 18 is applied to the motor 17 and presses the speed reducing gear 22d against the default stopper 24 in combination with the torque applied from the return spring 23. The throttle control unit 15 takes in an output of the throttle position sensor 21 and stores it, as an output of the throttle position sensor 21 in the default position, in a memory of the throttle control unit 15. A value of this output is defined as an output value in the default position of the throttle valve 18. Based on the output value thus stored, the throttle position is computed while compensating for an output value of the throttle position sensor 21 in a subsequent cycle. That process provides an effect of calibrating the origin of output of the throttle position sensor 21 and enables the throttle position to be positioned with higher accuracy.

A starter motor for starting up the engine starts cranking as soon as a starter on-switch is turned on after the key-on.

Region II—Movement of Throttle Valve Position: After the end of learning operation, the throttle control unit 15 causes the motor 17 to generate torque so that the throttle valve is moved to an idle position regardless of whether the cranking of the starter motor has ended. In other words, before the key switch is rotated to an ignition position, in which the starter motor is started to rotate, after being turned on, the throttle valve is moved to the idle position. At this time, the motor 17 is driven so as to generate maximum torque for changing the position of the throttle valve at a high speed. According to the characteristics of the throttle valve opening and closing device of the present invention, when the throttle valve is operated to rotate from the default position to the idle position, it must pass once a position in which there occurs a minimum opening area not enough to perform the idling (i.e., the throttle position (2) shown in FIG. 1). An adverse effect of such characteristics can be suppressed by changing the position of the throttle valve at a high speed. Stated another way, operating the throttle valve to pass the position (2) after the engine has started the self-sustained operation is not preferably because of a risk of engine stall.

Region III—Idle: During the idling, the engine control unit 11 provides a target value for the position of the throttle valve 18 to the throttle control unit 15 so that the engine is stabilized at an idle rotational speed. The motor 17 continues to generate the torque in the direction A to offset the torque applied from the return spring 23 in the direction B.

Region IV—Ramp Operation: During the operation (ramp operation) in which the engine load gradually increases from a no-load (throttle valve 18 being in the idle position) to a full load (throttle valve position (3), i.e., the fully opened position), the torque of the motor 17 is increased corresponding to the torque of the return spring which is increased in proportion to the change of the throttle position. To avoid a damage of the driving system (such as the motor and the gears) otherwise caused upon the gear striking against the full-open stopper 25, the fully opened position is controlled to be set such that the throttle valve is opened at an angle about 1° smaller than that in the fully opened position set for the mechanism.

In FIG. 8, a broken line represents a response in the throttle valve opening and closing device according to the first prior art disclosed in the above-cited JP,A 2-500677 (PCT Laid-Open Publication No. WO88/00404). The direction in which the spring load is applied changes between two zones on both sides of the default position such that the spring load is applied in the direction A (opening direction of the throttle valve) at the opening degree smaller than that corresponding to the default position, but it is reversed to the direction B (closing direction of the throttle valve) at the opening degree larger than that corresponding to the default position. In this case in which the ramp operation is performed at a moderate slope, the motor generates the torque in the direction opposed to the spring load until the throttle valve reaches the default position. Even after the throttle valve has reached the default position and the direction of the spring load is reversed, the torque generated by the motor is not reversed in direction until a deviation in excess of a certain level occurs, because the control unit executes position control on the basis of the opening degree output of a throttle position sensor, thus causing a delay in the operation of the throttle valve. In the present invention, since the spring load is always applied in the certain direction, there occurs no delay.

Region V—Engine Brake: To generate a larger engine brake force, it is desired to the flow rate of intake air introduced to the engine as small as possible. In the device such as disclosed in the first prior art, a full-close stopper is usually provided to avoid the throttle valve from rotating beyond the fully closed position, thereby preventing the throttle valve from interfering with the wall surface of the intake passage. Then, to minimize a damage of a driving system (such as the motor and gears) due to an impact force otherwise caused upon the gear striking against the full-close stopper, the fully closed position is controlled to be such that the throttle valve is closed at a position providing a larger opening degree than the minimum opening degree mechanically determined by the position of the full-close stopper. On the other hand, in the device of the present invention, because of no necessity of providing the full-close stopper, the minimum opening degree in terms of control can be set substantially equal to that in terms of mechanism, and hence a smaller opening area can be realized. Consequently, the device of the present invention is able to generate a larger engine brake force. Also, since a smaller opening area is provided, a higher negative pressure can be generated in the intake pipe downstream of the throttle valve, or a negative pressure can be created at a higher speed. This feature is effective in particularly increasing a response of an actuator driven by the negative pressure, e.g., a vacuum servo unit for braking.

Region VII—Key-off: After the key-off, the supply of electric power to the motor is stopped and the throttle valve 18 is returned to the default position by the torque applied from the return spring 23.

As will be seen from the above description, in ordinary condition of use, the throttle valve is operated in the range between the positions (2) and (3). During that range, a valuable merit is obtained in that, since the spring torque is not reversed in direction, good controllability of the throttle valve is achieved. Another merit is that, because of the absence of the full-close stopper, the opening degree in the fully closed position can be set to a smaller value. Further, since the throttle valve is in the default position when no electric power is supplied to the motor, the device of the present invention has a function of preventing the engine from stalling with no need of control by the throttle control unit in the event of a fail, e.g., sticking of the throttle valve due to freezing.

The fail-safe operation will be described below.

When the throttle control unit 15 or the engine control unit 11 finds a failure or a trouble of the throttle valve opening and closing device, the engine and the vehicle and the throttle valve must be returned to the default position at once, it is general to stop the supply of electric power to the motor of the throttle valve opening and closing device so that the throttle valve is returned to reach the default position by the torque applied from the return spring or another resilient member. That operation is effective particularly when the throttle position sensor is failed and the position control of the throttle valve can no longer be performed. With the present invention, by applying torque in a direction to rotate the throttle valve in the direction A without the control by the throttle control unit 15 in the fail-safe operation, the throttle valve can be returned to reach the default position at a higher speed because the direction of torque applied from the return spring is matched with the direction of the motor torque. It is therefore possible to realize the flow rate of intake air provided in the default position at a higher speed and to more quickly obtain the flow rate of intake air introduced to the engine, which corresponds to the default position. In view of the above feature, the throttle control unit for controlling the throttle valve opening and closing device of the present invention operates such that, upon detection of a failure, the motor is supplied with an electric current to rotate the throttle valve in the direction toward the default position (i.e., the direction B in FIG. 1). A time during which the electric current is supplied to the motor is limited by a timer in the throttle control unit and cut off after the electric current has been supplied for a certain time (about 1 second).

Next, a throttle valve opening and closing device for an internal combustion engine according to a third embodiment of the present invention will be described below with reference to FIGS. 9 to 11. Note that an intake passage of the throttle valve opening and closing device for the internal combustion engine according to the third embodiment has the same radial sectional structure as that shown in FIG. 3B.

Figure 9:
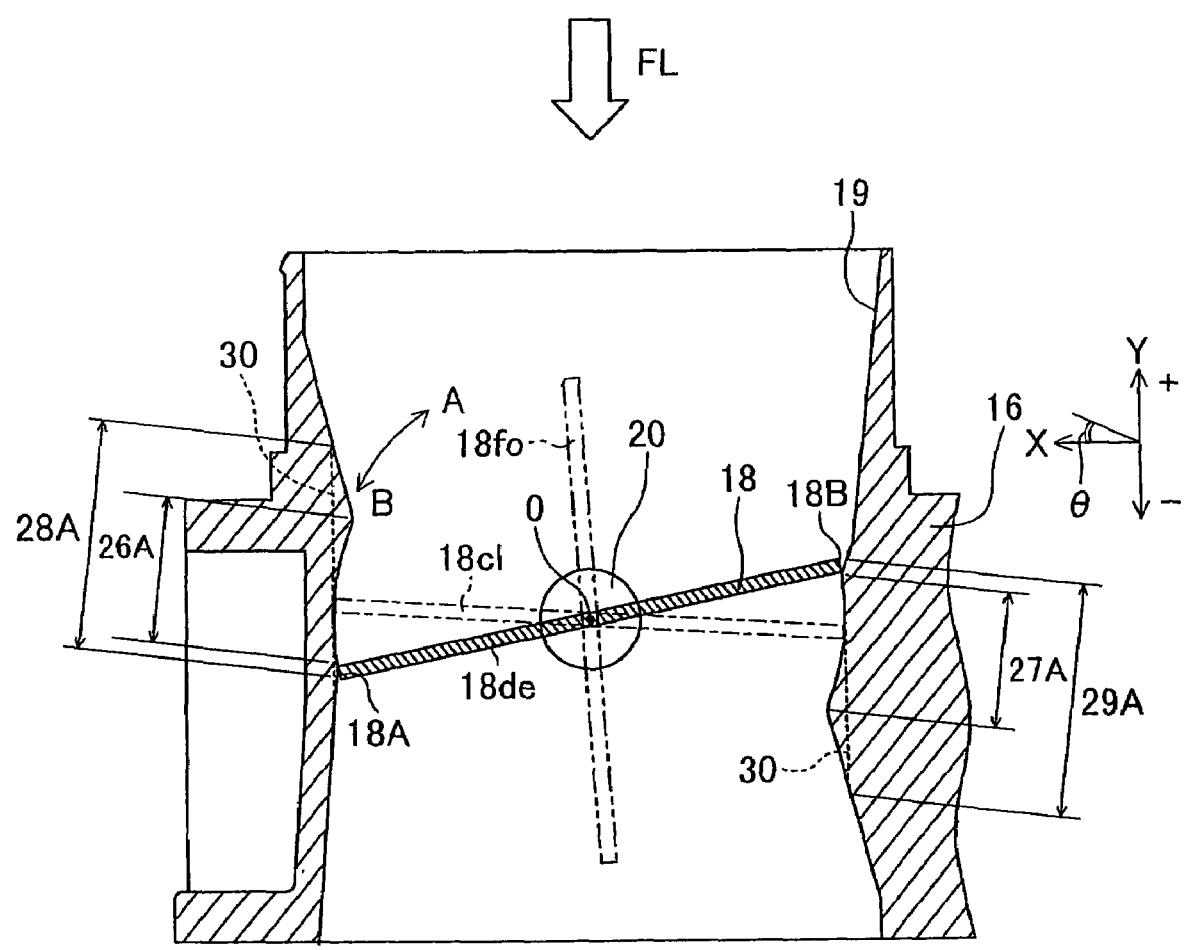
FIG. 9 is a sectional view of a throttle valve opening and closing device for an internal combustion engine according to a third embodiment of the present invention.

FIG. 9 is a sectional view of a throttle valve opening and closing device for an internal combustion engine according to the third embodiment of the present invention. FIG. 10 is an enlarged view of a principal part of FIG. 9. FIG. 11 is a graph showing respective characteristics of the throttle valve opening and closing devices for the internal combustion engines according to the embodiments of the present invention.

As shown in FIG. 9, first and second spherical recesses 26A, 27A are formed in a wall surface of an intake passage 19 along parts of spherical loci which are drawn by both outer peripheral edges of a throttle valve 18 when the throttle valve 18 rotates. It is here assumed that two outer peripheral edges of the throttle valve 18 are referred to as a first outer peripheral edge 18A rotating upstream of an airflow and a second outer peripheral edge 18B rotating downstream of the airflow when the throttle valve 18 rotates in a direction A. As described later in more detail with reference to FIG. 10, the first spherical recess 26A is formed in a zone of an inner peripheral surface of a throttle body 16 which is in an opposed relation to the first outer peripheral edge 18A of the opened and closed throttle valve 18, i.e., it is formed in a part of an imaginary cylindrical surface 30 forming the wall surface of the intake passage 19 so as to locate in a straddling relation to both the upstream and downstream sides of a throttle shaft 20.

Also, the second spherical recess 27A is formed in a part of the wall surface of the intake passage 19 which is in an opposed relation to the second outer peripheral edge 18B and is located in a straddling relation to both the upstream and downstream sides of the throttle shaft 20. In order to surely provide a minimum opening area when the outer peripheral edges of the throttle valve 18 are positioned to face the spherical recesses 26A, 27A, the arc length of each spherical recess 26A, 27A is set to be greater than the thickness of the throttle valve 18 as viewed in an axial section of an intake pipe.

Toward the inner peripheral side of the imaginary cylindrical surface 30, a projection 28A including the first spherical recess 26A and a projection 29A including the second spherical recess 27A are both formed on the wall surface of the intake passage 19. Thus, the spherical recesses 26A, 27A are formed in respective parts of the projections 28A, 29A.

Figure 10:
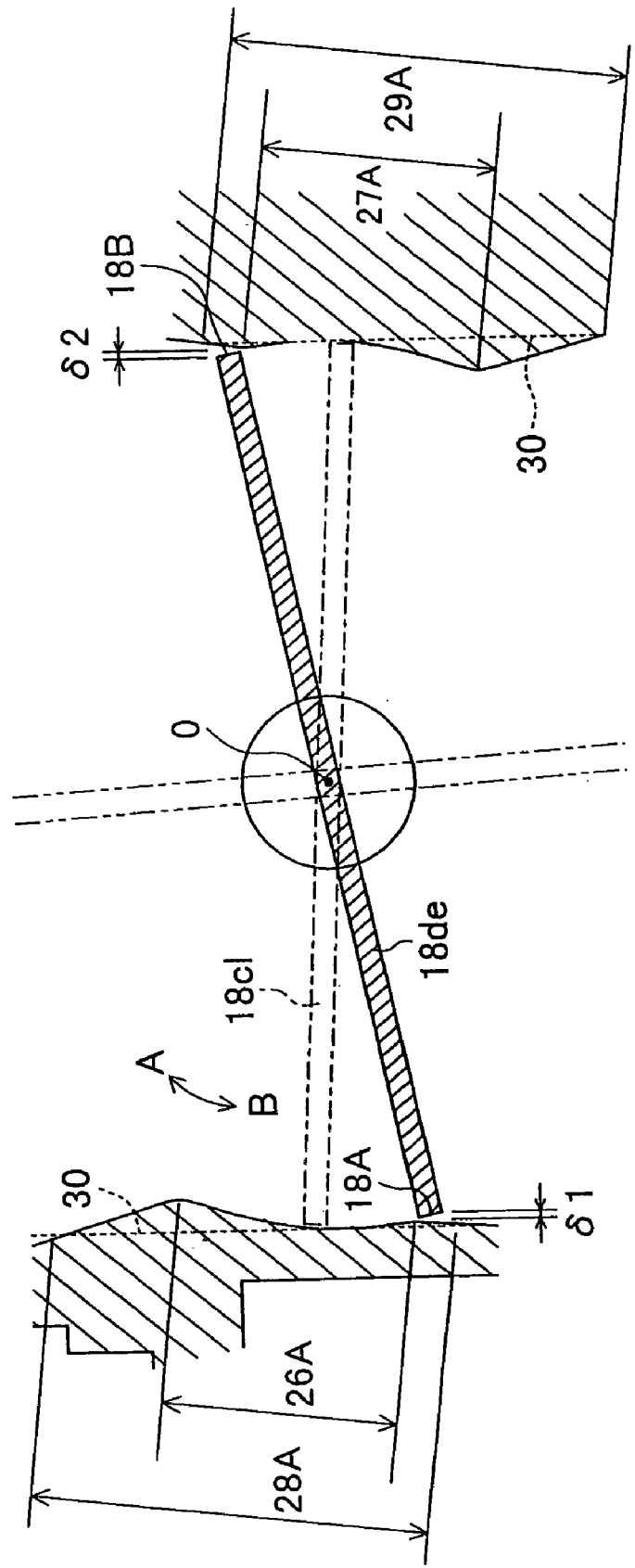
FIG. 10 is an enlarged view of a principal part of FIG. 9.

Areas downstream and upstream of the spherical recesses 26A, 27A are formed to provide smooth continuous wall surfaces including the spherical recesses so that opening degree characteristics of the throttle valve 18 will not abruptly change throughout before and after the throttle valve 18 passes the spherical recesses, i.e., that gaps $\delta 1$, $\delta 2$ shown in FIG. 10 will not abruptly change. Such moderate changes of the gaps $\delta 1$, $\delta 2$ make it possible to prevent an abrupt change of the opening area, i.e., an abrupt change in the flow rate of intake air with respect to the rotational angle of the throttle valve 18.

A throttle valve 18*de* indicated by a solid line in FIGS. 9 and 10 represents a state in which the throttle valve 18 is in the default position. A throttle valve 18*cl* indicated by a one-dot-chain line represents a state in which the throttle valve 18 is in the fully closed position. A throttle valve 18*fo* indicated by a two-dot-chain line represents a state in which the throttle valve 18 is in the fully opened position.

In the state of the throttle valve 18*de* indicated by the solid line, the throttle valve 18 is held in the default position by a return spring 23 (see FIG. 3B) and the gaps $\delta 1$, $\delta 2$ are left between the outer peripheral edges of the throttle valve 18 and the wall surface of the intake passage 19. In the default position, the outer peripheral edges of the throttle valve 18 are located offset respectively from the corresponding spherical recesses 26A, 27A. The gaps $\delta 1$, $\delta 2$ provide an opening area larger than a minimum opening area obtained in the fully closed position and ensure the flow rate of intake air required to maintain the default operation (such as self-sustained traveling or prevention of an engine stall).

When a motor 17 (see FIG. 3B) is supplied with an electric current to rotate the motor, the throttle valve 18 rotates in the direction A about the center O of the throttle shaft 20 and then reaches the fully closed position corresponding to the throttle valve 18cl indicated by the one-dot-chain line, in which the opening area is minimized. In the fully closed position, the gaps $\delta 1$, $\delta 2$ are minimized within the operating range of the throttle valve. Thus, in the fully closed position, the opening area achievable with the throttle valve opening and closing device of this embodiment is minimized and hence the flow rate of intake air flowing through the intake passage is also minimized.

Because of the spherical recesses 26A, 27A being formed in the inner peripheral surface of the throttle body 16, when the throttle valve 18 is positioned within regions of the spherical recesses 26A, 27A, the opening area of the gaps between the spherical recesses 26A, 27A and the throttle valve 18 is less apt to change and hence changes in the flow rate of intake air passing thorough the gaps are reduced.

With the further rotation of the throttle valve 18, the throttle valve 18 reaches the fully opened position corresponding to the throttle valve 18fo indicated by the two-dot-chain line, in which the opening area is maximized.

When the electric power supplied to the motor 17 is stopped, the throttle valve 18 is returned to the default position by the biasing force of the return spring 23. With the throttle valve 18 held on standby in the default position, larger gaps are maintained between the inner peripheral surface of the throttle body 16 and the throttle valve 18, and the throttle valve 18 can be prevented from sticking to the inner peripheral surface of the throttle body 16 due to the buildup of viscous materials, ices, etc. Also, it is possible to ensure self-sustained traveling and to prevent an engine stall.

A description is now made of the difference between the third embodiment shown in FIGS. 9 and 10 and the first embodiment shown in FIG. 1. It is here assumed that, as shown in FIG. 9, a direction perpendicular to the flowing direction FL of intake air is represented by an X-axis and the flowing direction FL of intake air is represented by a Y-axis. Also, it is assumed that the opening degree (angle) of the throttle valve oriented in the direction of the X-axis is 0°, an angle $\theta$ formed by the throttle valve positioned in nearer to the fully opened position relative to the X-axis is positive (+), and an angle formed by the throttle valve positioned in the opposed direction relative the X-axis is negative (–).

In the first embodiment shown in FIG. 1, the throttle valve 18 is movable within the range in which the angle $\theta$ is positive (+). Then, the first spherical recess 26 is formed in a part of the wall surface of the intake passage 19 upstream of the throttle shaft 20, and the second spherical recess 27 is formed in a part of the wall surface of the intake passage 19 downstream of the throttle shaft 20.

On the other hand, in the third embodiment shown in FIG. 9, the throttle valve 18 is movable within the range in which the angle $\theta$ is positive (+) and negative (–). Then, the first spherical recess 26A is formed in a part of the wall surface of the intake passage 19 which is located in a straddling relation to both the upstream and downstream sides of the throttle shaft 20, and the second spherical recess 27A is formed in a part of the wall surface of the intake passage 19 which is also located in a straddling relation to both the upstream and downstream sides of the throttle shaft 20.

The difference in characteristics between the first and third embodiments will be described with reference to FIG. 11. In FIG. 11, the horizontal axis represents the angle $\theta$ of the throttle valve and the vertical axis represents the opening area. A solid line F1 represents characteristics of the first embodiment shown in FIG. 1 and a broken line F2 represents characteristics of the third embodiment shown in FIG. 9.

In the first embodiment of FIG. 1 represented by the solid line F1, an angle $\theta 11$ of the throttle valve in the default position is, for example, 5°. The position of the minimum opening area is within an angle range of $\theta 12$ to $\theta 13$, for example, 17° to 23°. An angle $\theta$max of the throttle valve in the fully opened position is, for example, 85°.

On the other hand, in the third embodiment of FIG. 9 represented by the broken line F2, an angle $\theta 21$ of the throttle valve in the default position is, for example, –18°. The position of the minimum opening area is within an angle range of $\theta 22$ to $\theta 23$, for example, –3° to 5°. An angle $\theta$max of the throttle valve in the fully opened position is, for example, 85°. In addition, in the range between the position $\theta 23$ of the minimum opening area and the fully opened position, a rate at which the opening area varies with respect to the angle of the throttle valve is changed at an angle $\theta 24$.

An ordinary control range, in which the amount of intake air flowing through the intake passage is controlled by using the throttle valve opening and closing device, is from the position of the minimum opening area and the fully opened position. In the first embodiment represented by the solid line F1, an ordinary control range THcont1 is from $\theta 13$ to $\theta$max (23° to 85°). In the third embodiment represented by the broken line F2, an ordinary control range THcont2 is from $\theta 23$ to $\theta$max (5° to 85°). Accordingly, the ordinary control range THcont2 of the third embodiment shown in FIG. 9 is wider than the ordinary control range THcont1 of the first embodiment shown in FIG. 1. With the ordinary control range THcont set to cover a wider range, a change of the opening area resulting from changing the angle of the throttle valve by 1°, for example, can be reduced and so a change in the amount of intake air. As a result, resolution in control of the engine revolution speed can be increased.

Figure 11:
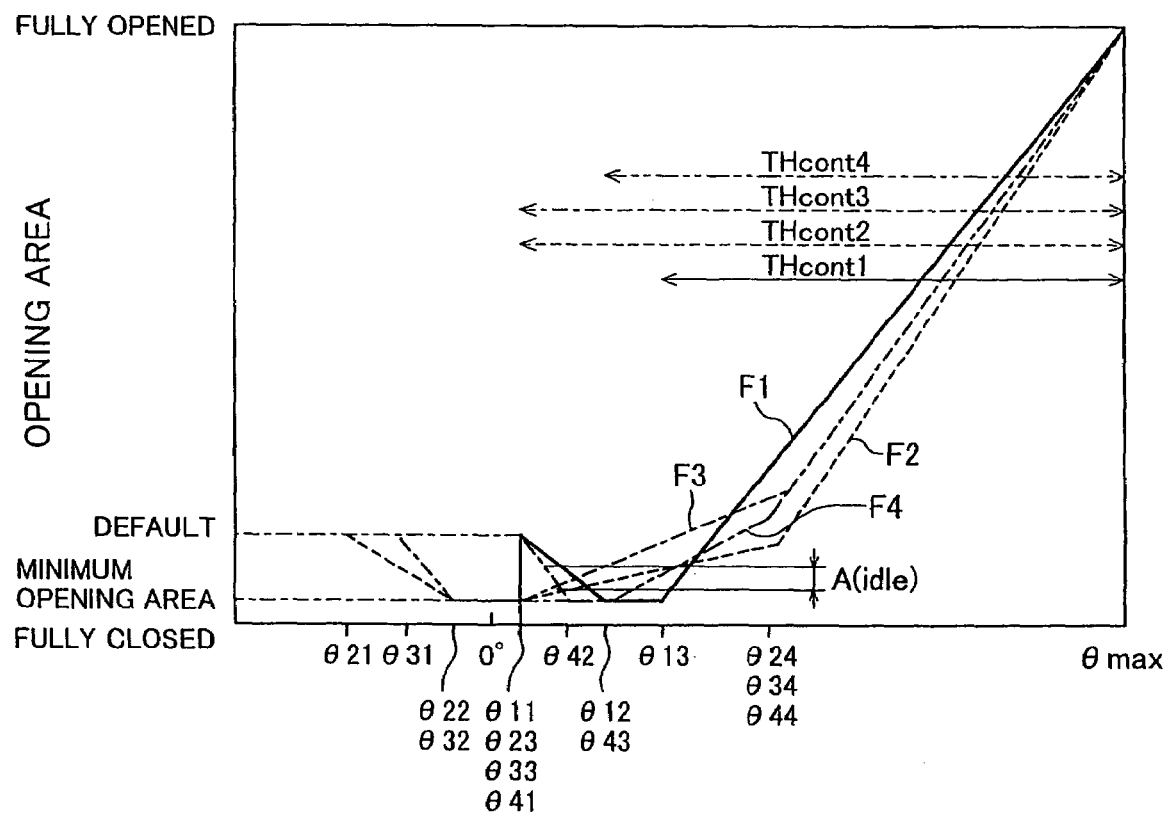
FIG. 11 is a graph showing respective characteristics of the throttle valve opening and closing devices for the internal combustion engines according to the embodiments of the present invention.

Further, as shown in FIG. 11, looking at the range of an opening area Aidle used in idle control, a change of the opening area resulting from changing the angle of the throttle valve by 1°, for example, can also be reduced and so a change in the flow rate of intake air. As a result, resolution in control of the idle revolution speed can be increased likewise.

Moreover, in the third embodiment of FIG. 9 represented by the broken line F2, the position of the minimum opening area ranges from the angle $\theta 22$ to $\theta 23$ (–3° to 5°) and the ordinary control range THcont2 is from $\theta 23$ to $\theta$max (5° to 85°). Within the range in which a change in the flow rate of intake air is small, therefore, the third embodiment sets a position ($\theta 23$) of minimum opening degree in control and has a region ($\theta 22$ to $\theta 23$) in which the flow rate of intake air does not change even when the throttle valve is further rotated in the closing direction from the position ($\theta 23$). In other words, the characteristics of the third embodiment are set such that, even when the throttle valve is brought into a state exceeding the position of minimum opening degree in control during the engine control, troubles such as an abrupt rise of the engine revolution speed and an engine stall are prevented.

With this third embodiment, as described above, resolution in control of the engine revolution speed can be increased in addition to the advantages obtained with the first embodiment. Also, resolution in control of the idle revolution speed can be increased.

Thus, the third embodiment can provide a throttle valve opening and closing device having advantages given below. When the driving force of means for driving the throttle valve opening and closing device is not generated, the throttle valve can be held in the default position. Also, when the throttle valve is rotated from the default position to the fully opened position, the throttle valve can be operated at a high speed without reversing the direction of movement thereof. During the engine operation, good control performance is achieved because the biasing force applied to the throttle valve is not reversed in the operating range of the throttle valve. The default mechanism has a simpler structure and hence can be mounted to a vehicle with higher mountability. In addition, since the throttle valve opening and closing device of the third embodiment includes only one return spring for biasing the throttle valve in the closing direction, spring load characteristics are simplified to be defined by one characteristic and therefore controllability is improved.

Next, a throttle valve opening and closing device for an internal combustion engine according to a fourth embodiment of the present invention will be described below with reference to FIGS. 12 and 13. Note that an intake passage of the throttle valve opening and closing device for the internal combustion engine according to the fourth embodiment has the same radial sectional structure as that shown in FIG. 3B. Also, characteristics of the throttle valve opening and closing device for the internal combustion engine according to the fourth embodiment are shown by F3 in FIG. 11.

Figure 12:
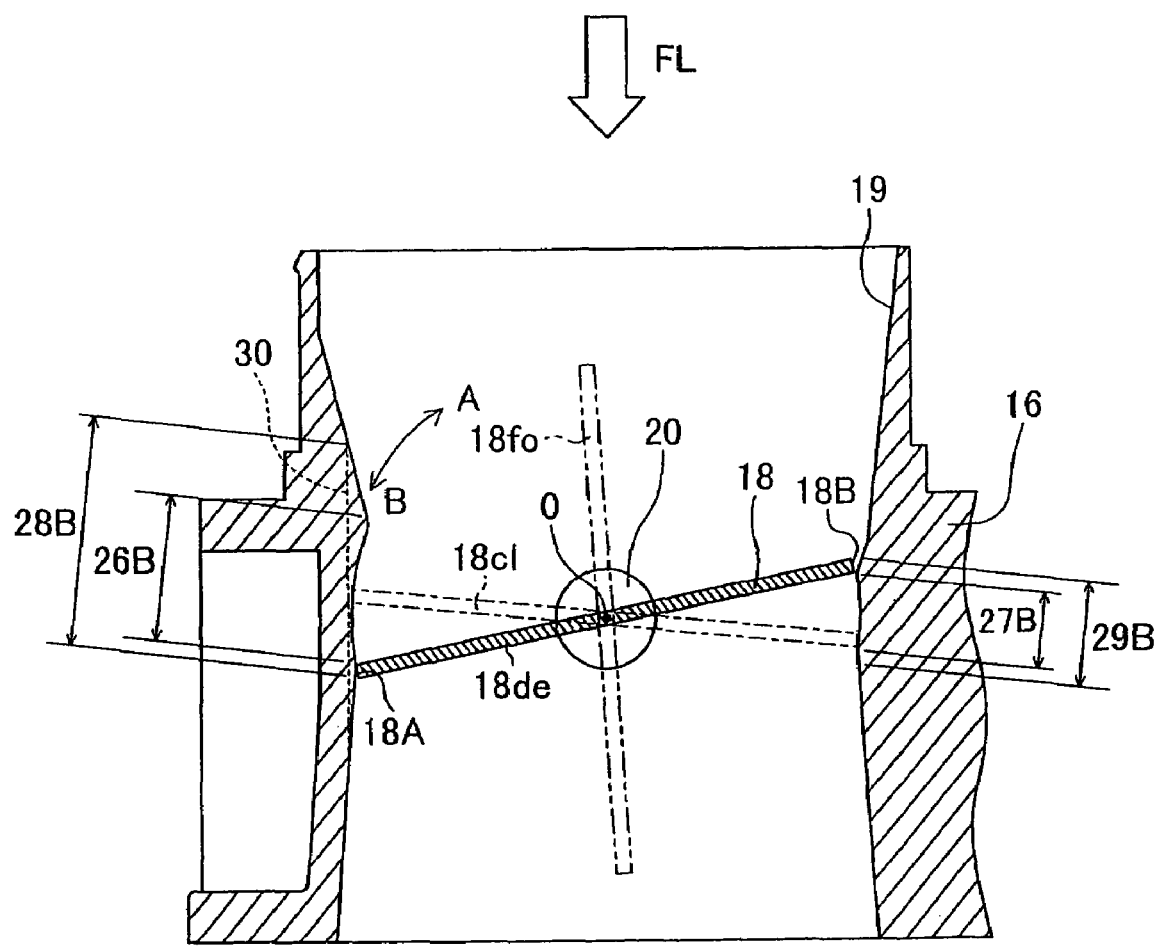
FIG. 12 is a sectional view of a throttle valve opening and closing device for an internal combustion engine according to a fourth embodiment of the present invention.
Figure 13:
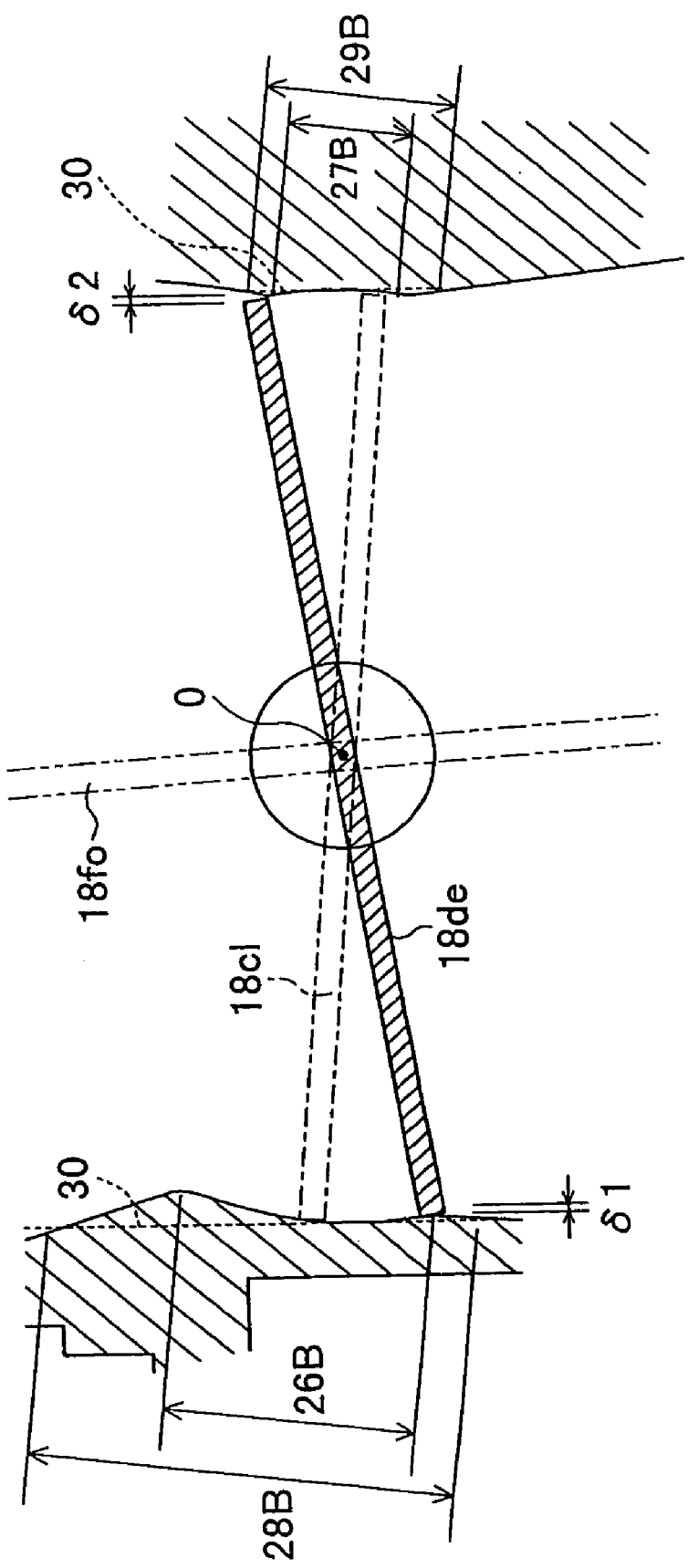
FIG. 13 is an enlarged view of a principal part of FIG. 12.

FIG. 12 is a sectional view of a throttle valve opening and closing device for an internal combustion engine according to a fourth embodiment of the present invention. FIG. 13 is an enlarged view of a principal part of FIG. 12. Note that the same characters as those in FIGS. 9 and 10 denote the same components.

As shown in FIG. 12, first and second spherical recesses 26B, 27B are formed in a wall surface of an intake passage 19 along parts of spherical loci which are drawn by first and second outer peripheral edges 18A, 18B of a throttle valve 18 when the throttle valve 18 rotates. As shown in FIG. 13 in more detail, the first spherical recess 26B is formed in a zone of an inner peripheral surface of a throttle body 16 which is in an opposed relation to the first outer peripheral edge 18A of the opened and closed throttle valve 18, i.e., it is formed in a part of an imaginary cylindrical surface 30 forming the wall surface of the intake passage 19 so as to locate in a straddling relation to both the upstream and downstream sides of a throttle shaft 20. Also, the second spherical recess 27B is formed in a part of the wall surface of the intake passage 19 which is in an opposed relation to the second outer peripheral edge 18B and is located in a straddling relation to both the upstream and downstream sides of the throttle shaft 20. In order to surely provide a minimum opening area when the outer peripheral edges of the throttle valve 18 are positioned to face the spherical recesses 26B, 27B, the arc length of each spherical recess 26B, 27B is set to be greater than the thickness of the throttle valve 18 as viewed in an axial section of an intake pipe.

Toward the inner peripheral side of the imaginary cylindrical surface 30, a projection 28B including the first spherical recess 26B and a projection 29B including the second spherical recess 27B are both formed on the wall surface of the intake passage 19. Thus, the spherical recesses 26B, 27B are formed in respective parts of the projections 28B, 29B.

This fourth embodiment differs from the third embodiment shown in FIGS. 9 and 10 as follows. The first spherical recess 26B has substantially the same arc length as that of the first spherical recess 26A shown in FIGS. 9 and 10. However, the second spherical recess 27B has a shorter arc length than that of the second spherical recess 27A shown in FIGS. 9 and 10.

Characteristics of this fourth embodiment will now be described with reference to FIG. 11. A one-dot-chain line F3 represents the characteristics of this fourth embodiment shown in FIGS. 12 and 13.

In the fourth embodiment represented by the one-dot-chain line F3, an angle θ31 of the throttle valve in the default position is, for example, −13°. The position of the minimum opening area is within an angle range of θ32 to θ33, for example, −3° to 5°. An angle θmax of the throttle valve in the fully opened position is, for example, 85°. An ordinary control range THcont3 is the same as the ordinary control range THcont2 in the third embodiment shown in FIGS. 9 and 10.

Comparing with the third embodiment of FIGS. 9 and 10 represented by the broken line F2, a first different point resides in the angles θ31, θ21 of the throttle valve in the default position. In other words, the throttle valve can be more quickly moved to the default position in the fourth embodiment shown in FIGS. 12 and 13. Also, when the throttle valve is moved across the position of the minimum opening area as occurred in the region II of FIG. 8, it is possible to cut down a time required for the movement of the throttle valve. A second different point is that resolution in control of the throttle valve angle in the region (θ33 to θ34) where the opening area is small is lower than that in the third embodiment shown in FIGS. 9 and 10, but resolution in control of the throttle valve angle in the region (θ34 to θmax) where the opening area is large is higher than that in the third embodiment shown in FIGS. 9 and 10. Accordingly, it is possible to increase resolution in control of the engine revolution speed in a revolution speed range higher than the idle revolution speed, i.e., in a traveling range of a vehicle equipped with an ordinary internal combustion engine. As a third different point, because of the shape difference in the inner peripheral surface of the throttle body 16 between FIG. 12 and FIG. 9, this fourth embodiment enables the throttle body to be formed by easer working and hence can improve workability.

With this fourth embodiment, as described above, the time required for moving the throttle valve across the position of the minimum opening area can be cut down in addition to the advantages obtained with the third embodiment. Also, resolution in control of the engine revolution speed in the traveling range of the vehicle can be increased. Further, it is possible to more easily work the throttle body and to improve workability.

Figure 15:
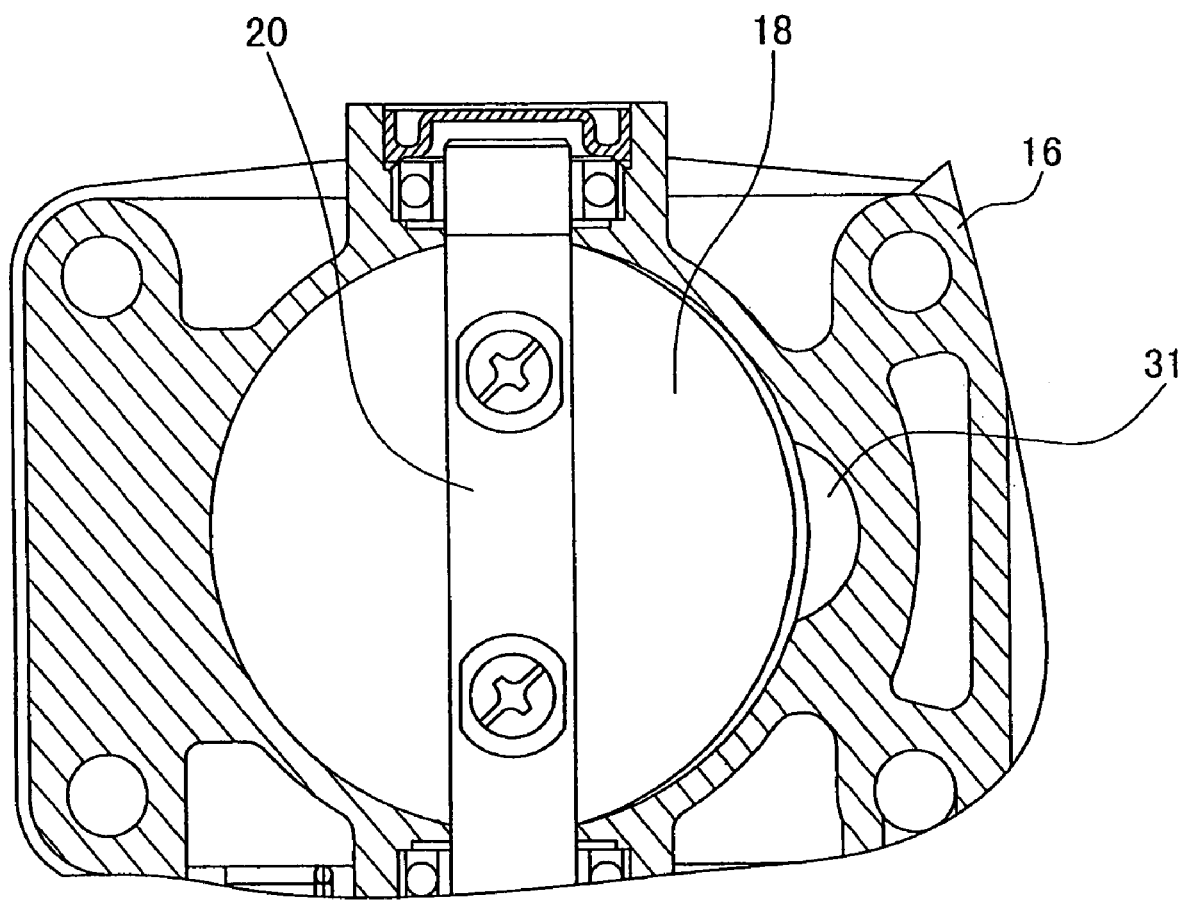
FIG. 15 is a plan view of the throttle valve opening and closing device for the internal combustion engine according to the fifth embodiment of the present invention.
Figure 16:
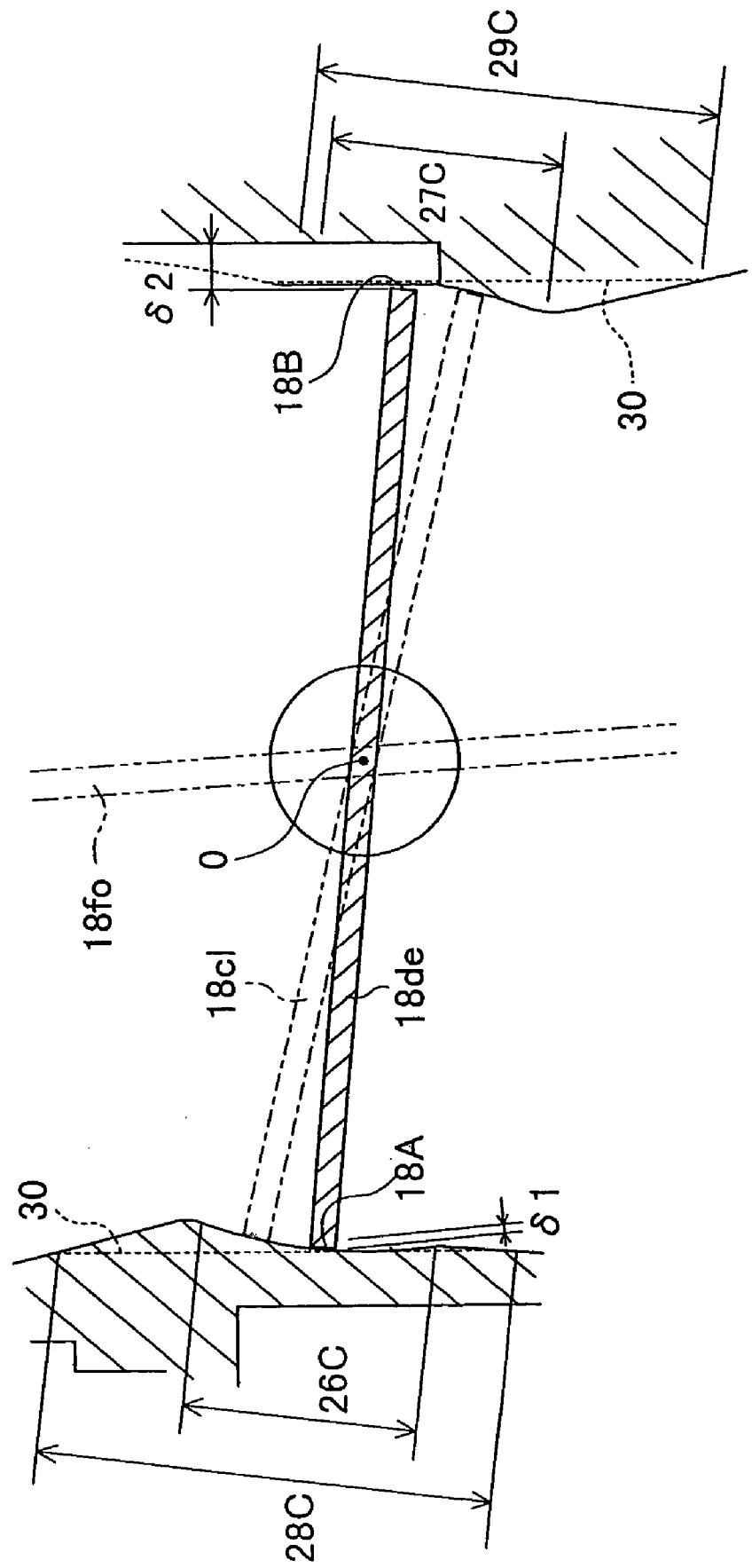
FIG. 16 is an enlarged view of a principal part of FIG. 14.

Next, a throttle valve opening and closing device for an internal combustion engine according to a fifth embodiment of the present invention will be described below with reference to FIGS. 14 to 16. Note that an intake passage of the throttle valve opening and closing device for the internal combustion engine according to the fifth embodiment has the same radial sectional structure as that shown in FIG. 3B. Also, characteristics of the throttle valve opening and closing device for the internal combustion engine according to the fourth embodiment are shown by F4 in FIG. 11.

Figure 14:
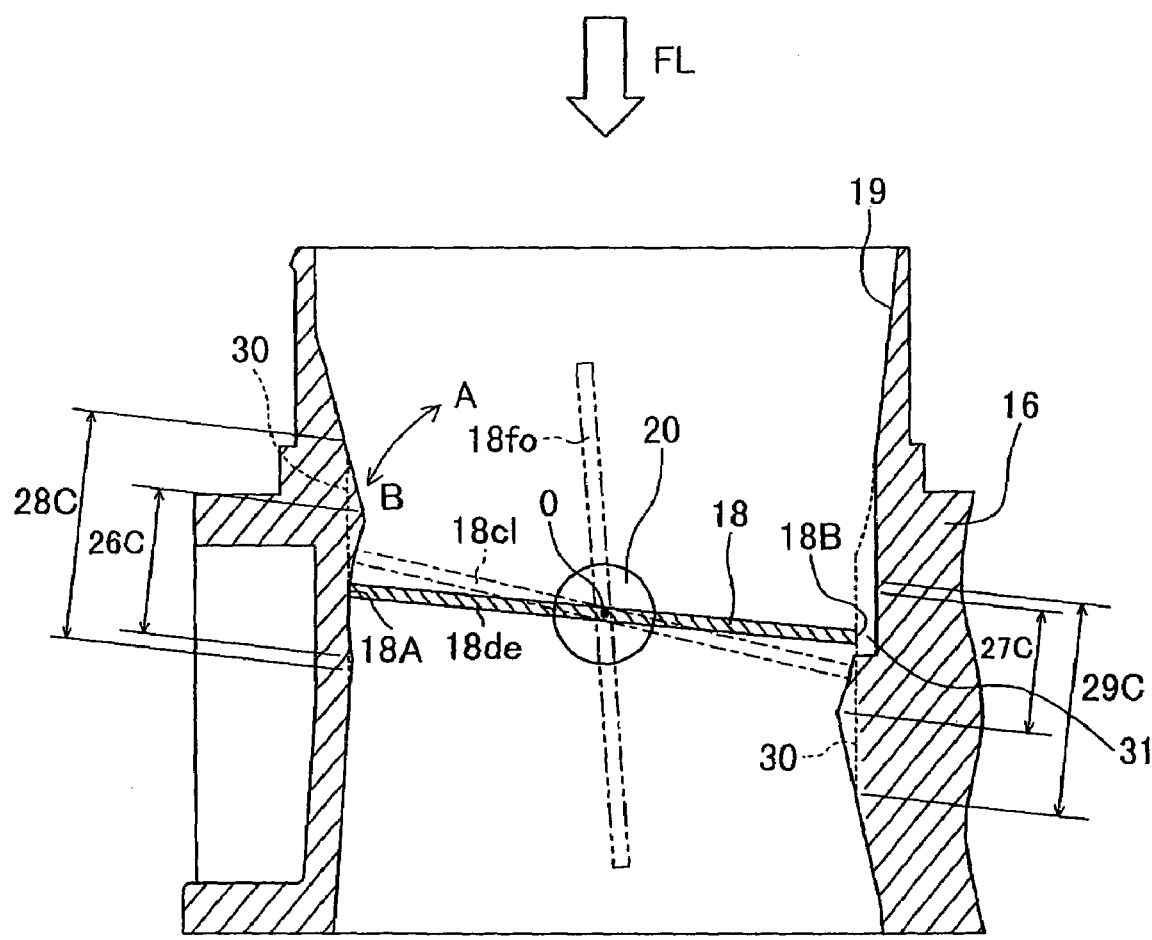
FIG. 14 is a sectional view of a throttle valve opening and closing device for an internal combustion engine according to a fifth embodiment of the present invention.

FIG. 14 is a sectional view of a throttle valve opening and closing device for an internal combustion engine according to a fifth embodiment of the present invention. FIG. 15 is a plan view of the throttle valve opening and closing device for the internal combustion engine according to the fifth embodiment of the present invention. FIG. 16 is an enlarged view of a principal part of FIG. 14. Note that the same characters as those in FIGS. 9 and 10 denote the same components.

As shown in FIG. 14, first and second spherical recesses 26C, 27C are formed in a wall surface of an intake passage 19 along parts of spherical loci which are drawn by first and second outer peripheral edges 18A, 18B of a throttle valve 18 when the throttle valve 18 rotates. As shown in FIG. 16 in more detail, the first spherical recess 26C is formed in a zone of an inner peripheral surface of a throttle body 16 which is in an opposed relation to the first outer peripheral edge 18A of the opened and closed throttle valve 18, i.e., it is formed in a part of an imaginary cylindrical surface 30 forming the wall surface of the intake passage 19 so as to locate in a straddling relation to both the upstream and downstream sides of a throttle shaft 20. Also, the second spherical recess 27C is formed in a part of the wall surface of the intake passage 19 which is in an opposed relation to the second outer peripheral edge 18B and is located in a straddling relation to both the upstream and downstream sides of the throttle shaft 20. In order to surely provide a minimum opening area when the outer peripheral edges of the throttle valve 18 are positioned to face the spherical recesses 26C, 27C, the arc length of each spherical recess 26B, 27B is set to be greater than the thickness of the throttle valve 18 as viewed in an axial section of an intake pipe.

Toward the inner peripheral side of the imaginary cylindrical surface 30, a projection 28C including the first spherical recess 26C and a projection 29C including the second spherical recess 27C are both formed on the wall surface of the intake passage 19. Thus, the spherical recesses 26C, 27C are formed in respective parts of the projections 28C, 29C.

This fifth embodiment differs from the third embodiment shown in FIGS. 9 and 10 as follows. The first spherical recess 26C has substantially the same shape as that of the first spherical recess 26A shown in FIGS. 9 and 10. However, the second spherical recess 27C has a groove 31 formed in part therein. As shown in FIG. 15, the groove 31 has a semicircular sectional shape. Therefore, when the throttle valve 18 is in the default position as indicated by a solid-line throttle valve 18de as shown in FIG. 16, a gap $\delta 1$ is formed between the first spherical recess 26C and the first outer peripheral edge 18A of the throttle valve 18, while a gap $\delta 2$ larger than the gap $\delta 1$ is formed between the second spherical recess 27C and the second outer peripheral edge 18B of the throttle valve 18. Thus, a sufficient opening area can be ensured in the default position.

Characteristics of this fifth embodiment will now be described with reference to FIG. 11. A two-dot-chain line F4 represents the characteristics of this fifth embodiment shown in FIGS. 14 to 16.

In the fifth embodiment represented by the two-dot-chain line F4, an angle $\theta 41$ of the throttle valve in the default position is, for example, 5°. The position of the minimum opening area is within an angle range of $\theta 42$ to $\theta 43$, for example, 12° to 17°. An angle $\theta$max of the throttle valve in the fully opened position is, for example, 85°. An ordinary control range THcont4 is narrower than the ordinary control ranges THcont2, THcont3 in the third and fourth embodiments shown in FIGS. 9 to 13, but it is wider than the ordinary control range THcont1 in the first embodiment shown in FIG. 1.

Comparing with the first embodiment of FIG. 1 represented by the solid line F1, a first different point is that the angles $\theta 11$, $\theta 41$ of the throttle valve in the default position are the same, but the angle ranges of the position of the minimum opening area between $\theta 11$ to $\theta 12$ and $\theta 41$ to $\theta 42$ differ from each other. More specifically, the range from $\theta 11$ to $\theta 12$ in the first embodiment represented by the solid line F1 is 12°, while the range from $\theta 41$ to $\theta 42$ in the third embodiment represented by the two-dot-chain line F4 is 7°. The reason is that, because the groove 31 is formed in a part of the second spherical recess 27C, the opening area can be abruptly increased and a sufficient flow rate can be ensured in the default position. As a result, the throttle valve can be more quickly moved from the position of the minimum opening area to the default position. As a second different point, the ordinary control range THcont4 can be set wider than the ordinary control range THcont1 in the first embodiment represented by the solid line F1, and therefore resolution in control of the engine revolution speed in a traveling range of a vehicle equipped with an ordinary internal combustion engine can be increased.

With this fifth embodiment, as described above, the time required for moving the throttle valve to the default position can be cut down in addition to the advantages obtained with the first embodiment. Also, resolution in control of the engine revolution speed in the traveling range of the vehicle can be increased.

According to the present invention, as described above, the throttle valve can be held in the default position with a simple mechanism when no forces for driving the throttle valve are generated, and the throttle valve can be operated at a high speed from the default position to the fully opened position.

What is claimed is:

1. A throttle body used for a motor driving type throttle valve device,
   wherein a pair of projecting portions for opposing to an outer edge of said throttle valve are formed at a half of an inner wall and at an upper side of an intake air passage for a throttle shaft providing a throttle valve and at a half of an inner wall and at a lower side of an intake air passage for said throttle shaft, and formed at an upper and a lower side in a direction of an air passage with an interval;
   passage opening section area formed between an outer edge of said throttle valve and an inner wall of said intake passage at the positions of said projecting portions are a minimum value;
   a rotating start position of said throttle valve is formed near both of said projecting portions in rotating directions;
   an air flow rate increases slightly when said throttle valve rotates in both a direction toward said rotating start position and in a direction toward a rotating end position over said pair of projecting portions.

2. A throttle body used for a motor driving type throttle valve device according to claim 1, wherein a spherical portion which is formed along rotation tracks of said throttle valve is comprising at least one of a pair of projecting portions.

3. A throttle body used for a motor driving type throttle valve device according to claim 1, wherein at said minimum opening degree position, said throttle body is constructed to obtain an air flow rate for maintaining a minimum idling rotational speed of an internal combustion engine.

4. A throttle body used for a motor driving type throttle valve device according to claim 1, wherein a necessary air amount for a vehicle self running is obtained at said rotating start position.

5. A throttle body used for a motor driving type throttle valve device according to claim 2, wherein said spherical portion has a range formed in a range larger than a thickness of said throttle valve.

* * * * *